United States Patent [19]
Allen

[11] Patent Number: 5,988,344
[45] Date of Patent: Nov. 23, 1999

[54] FLUID POWER TRANSMISSION CLUTCH BRAKE

[75] Inventor: Kevin Michael Allen, Bartlesville, Okla.

[73] Assignee: Meritor Heavy Vehicle Systems, L.L.C., Troy, Mich.

[21] Appl. No.: 08/931,379

[22] Filed: Sep. 16, 1997

[51] Int. Cl.⁶ .................................................. B60K 41/26
[52] U.S. Cl. ......................... 192/216; 192/219; 192/221; 192/13 R; 192/12 A
[58] Field of Search .................................. 192/216, 219, 192/221, 13 R, 12 A

[56] References Cited

U.S. PATENT DOCUMENTS

| | | | |
|---|---|---|---|
| 2,771,967 | 11/1956 | Larson | 188/270 |
| 3,684,067 | 8/1972 | Anderson | 192/12 A |
| 4,257,504 | 3/1981 | Hanke | 192/12 A |
| 4,819,774 | 4/1989 | Bieber | 192/216 |
| 4,884,669 | 12/1989 | Ehrlinger | 192/216 |
| 4,946,014 | 8/1990 | Okada | 192/216 |
| 5,333,707 | 8/1994 | Kaneda | 192/296 |

*Primary Examiner*—Charles A. Marmor
*Assistant Examiner*—Saúl J. Rodriguez
*Attorney, Agent, or Firm*—Howard & Howard

[57] ABSTRACT

Rotation of transmission shafts as typically provided by the clutch brake is instead provided by increasing the load on the transmission shafts. In one embodiment, this is achieved by restricting flow through the supply line between the shaft driven pump and the oil cooler. By restricting this flow, the load on the pump increases, and the torque required to drive the pump increases. This, in turn, retards rotation of the transmission shafts to achieve the function typically provided by the clutch brake of stopping rotation. The present invention thus provides the function without the requirement of a clutch brake. The present invention is much more easily serviced or replaced than a clutch brake, and includes only elements which are accessible from outside of the transmission, and thus may be easily serviced or replaced.

11 Claims, 1 Drawing Sheet

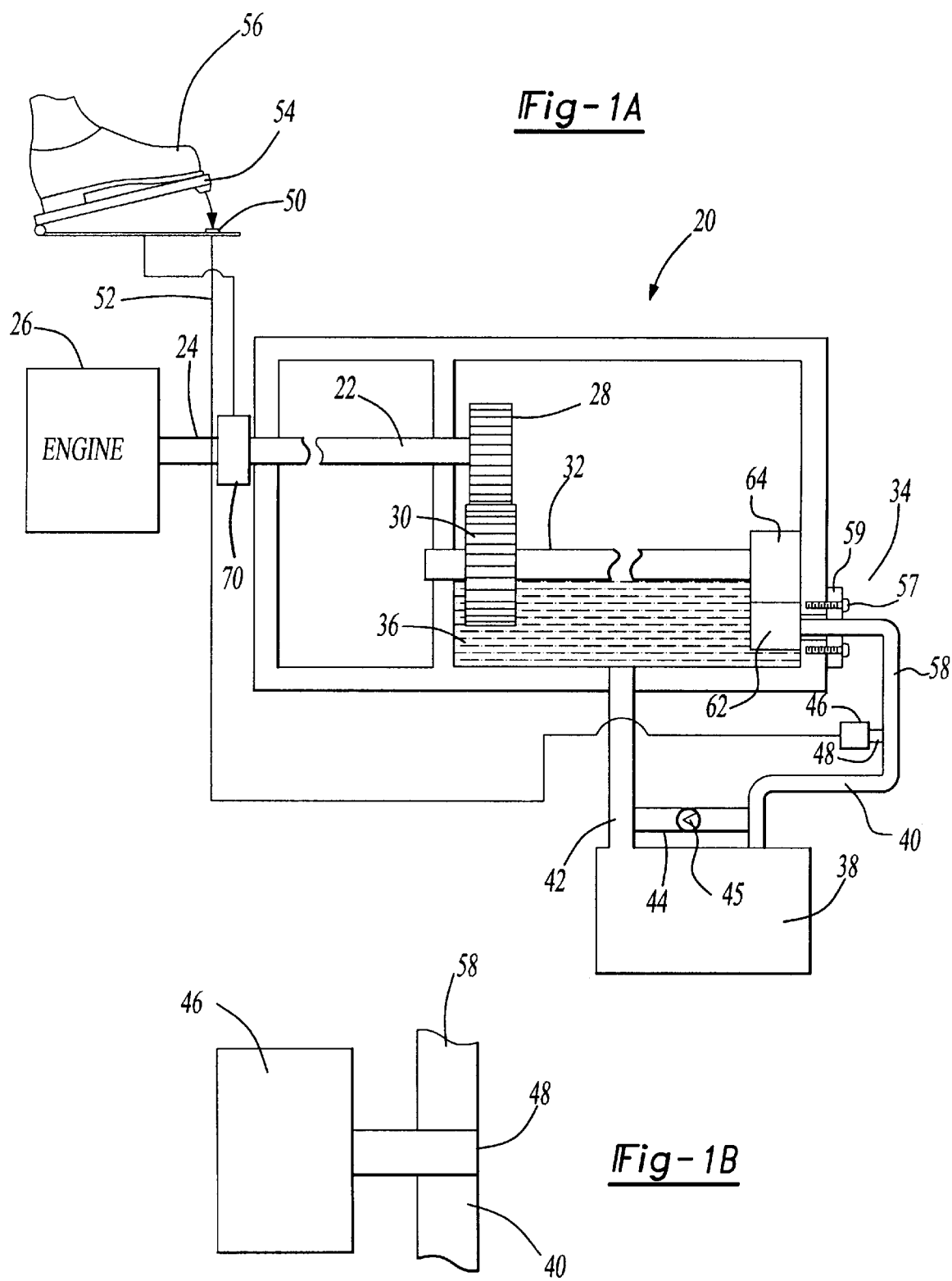

FLUID POWER TRANSMISSION CLUTCH BRAKE

BACKGROUND OF THE INVENTION

This invention relates to a fluid powered clutch brake for transmission.

Presently, when a clutch brake is actuated in a transmission, the driver moves the clutch pedal all the way to the floor. A clutch linkage then moves friction members into engagement with the clutch brake.

The friction engagement between the clutch brake and the members retards rotation of the transmission shafts and gears. The friction elements, however, are susceptible to wear and over-heating. Moreover, when the clutch plate becomes worn, replacement is difficult since it is mounted to surround the input shaft of the transmission. Thus, it is typically required to either cut off the clutch brake or remove the transmission. Current clutch brakes require milling slots in the transmission input shaft, which is expensive and adds stress risers.

Thus, the entire operation and function of the clutch brake has undesirable characteristics and requires high maintenance. Moreover, when maintenance is required it is most difficult as it is often necessary to remove the clutch brake from the transmission input shaft.

SUMMARY OF THE INVENTION

The present invention discloses a unique way of providing the clutch brake function without a clutch brake. Instead, the present invention places a load on the transmission shaft which in turn stops or slows the rotating shaft.

In particular, the load may be placed on the shaft by increasing the load on a shaft driven pump associated with the transmission. Known transmissions have a pump to supply oil to a oil cooler. Oil from the cooler is then returned to the pump or to components of the transmission. The present invention selectively drives a valve member into the supply passage from the pump to the cooler. The valve selectively blocks or at least restricts the passage. The pressure seen by the pump then increases rapidly and dramatically. The increased pressure seen at the pump increases the torque required to drive the pump. This, in turn, slows or stops the rotating transmission shaft.

In preferred embodiments of this invention, the valve is preferably placed upstream of a normal pressure relief valve associated into the transmission cooler supply line. If the high pressure is seen at the pressure relief valve, then the pressure relief valve would simply open, and the load on the pump would then not increase. Thus, it is preferred that the restricting valve is placed upstream of that pressure relief valve. In addition, the pump is preferably provided to be easily accessible from outside of the transmission. The switch and valve are also accessible from outside the transmission, as is the entire transmission oil cooler system. Thus, when maintenance is required, the entire system which is utilized to replace the clutch brake is easily accessible. In one preferred embodiment the pump is simply bolted to the outer wall of the transmission, and is thus easily accessible. In a preferred embodiment, the clutch pedal of the vehicle selectively actuates a switch to actuate the restriction valve.

These and other features of the present invention can be best understood from the following specification and drawing, the following of which is a brief description of the drawing.

BRIEF DESCRIPTION OF THE DRAWINGS

FIG. 1A shows a schematic view of a transmission incorporating the inventive system.

FIG. 1B shows the inventive system with the valve having moved to restrict the supply passage.

DETAILED DESCRIPTION OF THE PREFERRED EMBODIMENT

FIG. 1 shows a transmission 20 including an input shaft 22 being driven by shaft 24 from an engine 26. As known, shaft 22 drives a gear 28 which engages a gear 30 to drive a countershaft 32. As known, many other shafts and gears are received within the transmission. Countershaft 32 drives a lubricant pump 34, again as known.

Pump 34 communicates with a reservoir 36 of oil. The pump drives the oil to and from a transmission oil cooler 38. A supply line 40 leads from pump 34 to cooler 38, and a return line 42 returns the oil to the reservoir. In some transmission oil lubrication systems, the return line 42 may not lead directly back to the sump, but may instead be directed onto the transmission components, and then returned to sump. This invention also extends to this type, and any other type, lubricant system. A pressure relief circuit 44 includes a pressure release valve 45 which directly communicates supply line 40 to return line 42 under certain circumstances.

A restriction valve 46 such as a solenoid controlled valve is placed to have restriction element 48 selectively moved into supply line 40. A switch 50 communicates through line 52 to solenoid 46. A clutch pedal 54 selectively actuates switch 50, at the control of driver 56.

A clutch 70 is also actuated by the clutch pedal 54. As known, the clutch brake function is typically acuated when the clutch is open, When the driver moves the clutch pedal 54 beyond the normal clutch opening position, the switch 50 is actuated. Thus, when the retardation feature of this invention is actuated, the clutch 70 will be open.

Now, when it is desired to have the clutch brake actuated, as is typically the case in lower gears, or when starting from stop, the driver moves the clutch pedal 54 all the way down such that switch 50 is actuated. When switch 50 is actuated, element 48 moves from the retracted position shown in FIG. 1A to an extended restriction position, such as shown in FIG. 1B. Element 48 now blocks supply line 40. Pump 34 continues to turn and attempt to drive fluid into line 40. The pressure in a portion 58 of line 40 behind element 48 increases, and the torque required to drive pump 34 increases. The torque is directed back into the moving transmission shafts and gears, and the rotation of those shafts and gears is retarded and/or stopped. It is believed that in most applications the pressure in the portion 58 need not increase more than a few hundred pounds per square inch.

Pump 34 has a mount portion 59 secured by bolts 57 to the transmission wall 60 as shown in FIG. 1A. As shown the pump rotor 62 is positioned to be driven by a countershaft drive gear 64. This mount and connection are shown schematically, but do illustrate that the pump 34 may be easily removed from the transmission without disassembling the transmission. Moreover, the other elements of this inventive clutch brake system, namely switch 54, line 52, valve 46 and member 48 are all accessible from outside of the transmission. This is an improvement over the prior art clutch brakes, which typically required disassembly of the transmission for repair or replacement.

In summary, the present invention utilizes an additional load on the rotating shafts and gears to retard rotation of the shafts and gears when clutch braking is desired. In a preferred embodiment, this is achieved by increasing the load on the pump, thus requiring higher torque from the rotating shafts and gears, and stopping or retarding rotation of the shafts and gears. Other methods of increasing the load would come within the scope of this invention.

A preferred embodiment of this invention has been disclosed, however, a worker of ordinary skill in the art would recognize that certain modifications would come within the scope of this invention. For that reason, the following claims should be studied to determine the true scope and content of this invention.

What is claimed is:

1. A method of retarding rotation of a transmission comprising the steps of:
   (1) driving a transmission to rotate shafts and associated gears;
   (2) opening a clutch and selectively requesting the retardation of rotation of said shafts and gears;
   (3) increasing a load on said shafts and gears in response to said request to retard rotation of said shafts and gears; and
   said load being increased by providing a pump driven by one of said shafts, and increasing the torque requirement for driving said pump, said pump driving a lubricant through a supply line to a cooler, and said load being increased by the step of restricting flow of said lubricant through said supply line.

2. A method of retardation rotation of a transmission comprising the steps of:
   (1) driving a transmission to rotate shafts and associated gears;
   (2) opening a clutch and selectively requesting the retardation of rotation of said shafts and gears;
   (3) increasing a load on said shafts and gears in response to said request to retard rotation of said shafts and gears, wherein said request for retardation is made by the operator actuating a switch.

3. A method as recited in claim 2, wherein said load is increased by providing a pump which is driven by one of said shafts, and increasing the torque requirement for driving said pump.

4. A method as recited in claim 3, wherein said pump drives a lubricant through a supply line to a cooler, and said load is increased by restricting flow of said lubricant through said supply line.

5. A method as recited in claim 4, wherein said restriction is achieved by actuating a valve member to move into said supply line and restrict flow of the lubricant through said supply line to increase the fluid pressure in said supply line, and correspondingly increase the torque requirement to drive said pump.

6. A method as recited in claim 2, wherein said operator moves a clutch pedal to actuate said switch.

7. A transmission comprising:
   a plurality of shafts for selectively driving an output shaft at a plurality of different gear ratios through a plurality of different gears;
   structure to retard rotation of said shafts and said gears
   a switch to request actuation of said structure; and
   said transmission including at least one of said shafts driving a pump, said pump communicating a lubricant to and from a lubricant cooler, and said structure including a valve for selectively restricting flow through a supply line to said cooler from said pump, a pressure relief valve communicating said supply line to said pump, said valve being mounted in said supply line upstream of said relief valve.

8. A transmission as recited in claim 7, wherein said pump is attached to an outer wall of the transmission such that it may be removed from outside of said transmission.

9. A transmission as recited in claim 8, wherein said valve is accessible from outside of said transmission.

10. A transmission as recited in claim 7, wherein a switch selectively actuates said valve.

11. A transmission comprising:
    a plurality of shafts for selectively driving an output shaft at a plurality of different gear ratios through a plurality of different gears and a clutch for selectively connecting or disconnecting a drive input to said gear ratios;
    structure to retard rotation of said shafts and said gears, said structure only retarding rotation when said clutch is open;
    a switch to request actuation of said structure; and
    said switch is actuated by movement of a clutch pedal by the operator.

\* \* \* \* \*